US007443284B2

(12) United States Patent
Curtis

(10) Patent No.: US 7,443,284 B2
(45) Date of Patent: Oct. 28, 2008

(54) METHOD AND SYSTEM FOR SENDING EVENTS BETWEEN VEHICLES

(75) Inventor: Bryce Allen Curtis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 11/382,285

(22) Filed: May 9, 2006

(65) Prior Publication Data

US 2007/0262880 A1 Nov. 15, 2007

(51) Int. Cl.
*B60Q 1/00* (2006.01)

(52) U.S. Cl. ......................... 340/425.5; 340/438; 701/1

(58) Field of Classification Search .............. 340/425.5, 340/426.32, 438, 463, 465, 446, 447, 901, 340/903, 436; 701/1
See application file for complete search history.

(56) References Cited

U.S. PATENT DOCUMENTS 6,252,519 B1 * 6/2001 McKenna ................... 340/902
6,389,340 B1 * 5/2002 Rayner ........................ 701/35
6,765,495 B1 * 7/2004 Dunning et al. ............. 340/903
7,102,496 B1 * 9/2006 Ernst et al. .................. 340/436

OTHER PUBLICATIONS

Bryce Allen Curtis; Method and System for Sending Telemetric Information Between Vehicles.

* cited by examiner

*Primary Examiner*—Phung Nguyen
(74) *Attorney, Agent, or Firm*—Duke W. Yee; Matthew Talpis; James O. Skarsten

(57) ABSTRACT

The illustrative embodiments provide a method, a system, a computer program code, and a computer implemented method for sending events between vehicles. A vehicle detects an event, wherein the event is for a user action that indicates an intent to change movement of the vehicle. The vehicle determines whether the event should be sent to another vehicle. If the event should be sent to another vehicle, then the vehicle sends the event to the another vehicle.

7 Claims, 5 Drawing Sheets

METHOD AND SYSTEM FOR SENDING EVENTS BETWEEN VEHICLES

BACKGROUND OF THE INVENTION

1. Field of the Invention

The present invention relates generally to an improved method for communicating between vehicles. Still more particularly, the present invention relates to a method, system, computer program product, and computer implemented method for sending events between vehicles.

2. Description of the Related Art

To prevent vehicular accidents, users need to be alert and aware of the actions of other users. Currently, brake lights and turn signals provide some indication as to what a user may intend to do. However, these limited indicators are not enough to prevent an accident. In some instances, a user does not have enough time to trigger the indicators. For example, a user may suddenly swerve to avoid an object or another vehicle. Prior to swerving, the user typically does not have time to turn on the right or left turn signal. Even if the user did turn the signal on, the user seeing the indicator still may not have enough time to react to the turn signal to prevent hitting the object or the other vehicle. Furthermore, even if another user notices the turn signal, the signal indicator may not be informative enough to notify the other user that an object or vehicle needs to be avoided. Moreover, even if the indicators are used, users watching another vehicle swerve usually do not even notice the turn signal.

Currently, radar and sonar technology is used to measure the distances between vehicles. In some situations, the same technology is used to automatically slow down a vehicle in order to maintain a safe distance from a lead vehicle. Similar technology is also employed to help users gauge the distance of another vehicle during parallel parking. However, the radar and sonar technology in these instances are limited and respond only to the relative distance of a particular vehicle. The technology does not alert the user of a vehicle of a sudden action of a lead vehicle. Additionally, if the present vehicle is the lead vehicle, the technology also does not transmit the sudden move of the present vehicle.

SUMMARY OF THE INVENTION

The illustrative embodiments provide a method, a system, a computer program code, and a computer implemented method for sending events between vehicles. A vehicle detects an event, wherein the event is for a user action that indicates an intent to change movement of the vehicle. The vehicle determines whether the event should be sent to another vehicle. If the event should be sent to another vehicle, then the vehicle sends the event to the another vehicle.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
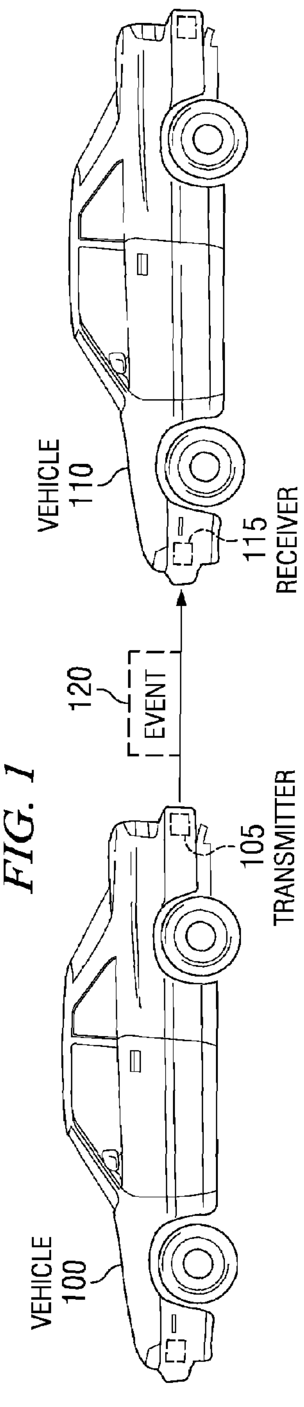
FIG. 1 illustrates a vehicle sending an event to another vehicle in accordance with an illustrative embodiment.

FIG. 1 illustrates a vehicle sending an event to another vehicle in accordance with an illustrative embodiment. FIG. 1 includes vehicles 100 and 110. Vehicles 100 and 110 may be traveling in any environment, such as a street or interstate highway. In the illustrative embodiment, vehicle 100 is a first vehicle and travels directly ahead of vehicle 110, which is a second vehicle.

Vehicle 100 includes transmitter 105. In the illustrative embodiment, transmitter 105 is disposed on the bumper of vehicle 100. However, transmitter 105 may also be disposed on the trunk, rear window, or any other location on vehicle 100. Transmitter 105 is any mechanism that can transmit a wireless communication, such as a light, transducer, antenna, or light emitting diode (LED).

Vehicle 110 includes receiver 115. In the illustrative embodiment, receiver 115 is disposed on the front bumper of vehicle 110. However, receiver 115 may also be disposed on the front hood, front window, or any other location on vehicle 110. Receiver 115 can be any mechanism that receives a wireless communication, such as a photo detector, light detector, sonic detector, or antenna.

In the illustrative embodiment, transmitter 105 sends event 120 to receiver 115. Any form of wireless communication, such as an infrared signal, a laser signal, a sonic signal, a radio transmission, or a wi-fi communication, may transmit event 120. Event 120 is an electrical communication that indicates the intent of a user to change the movement of vehicle 100. For example, an event may be a user braking, turning the steering wheel at the speed limit, or turning the steering wheel while vehicle 100 is slowing down. Thus, the corresponding change in movement of vehicle 100 may be vehicle 100 slowing down, changing lanes, or turning. Event 120 communicates the change in movement of vehicle 100 to vehicle 110. Event 120 may help the user of vehicle 110 respond appropriately to the present situation.

The illustrative embodiments are not limited to the example present herein. For example, vehicles 100 and 110 may each have a transmitter and receiver. Additionally, in another embodiment, event 120 may be sent via an intermediate medium, such as a network tower. In such an embodiment, vehicle 100 would transmit event 120 to a network tower, and the network tower would then forward event 120 to vehicle 110.

Figure 2:
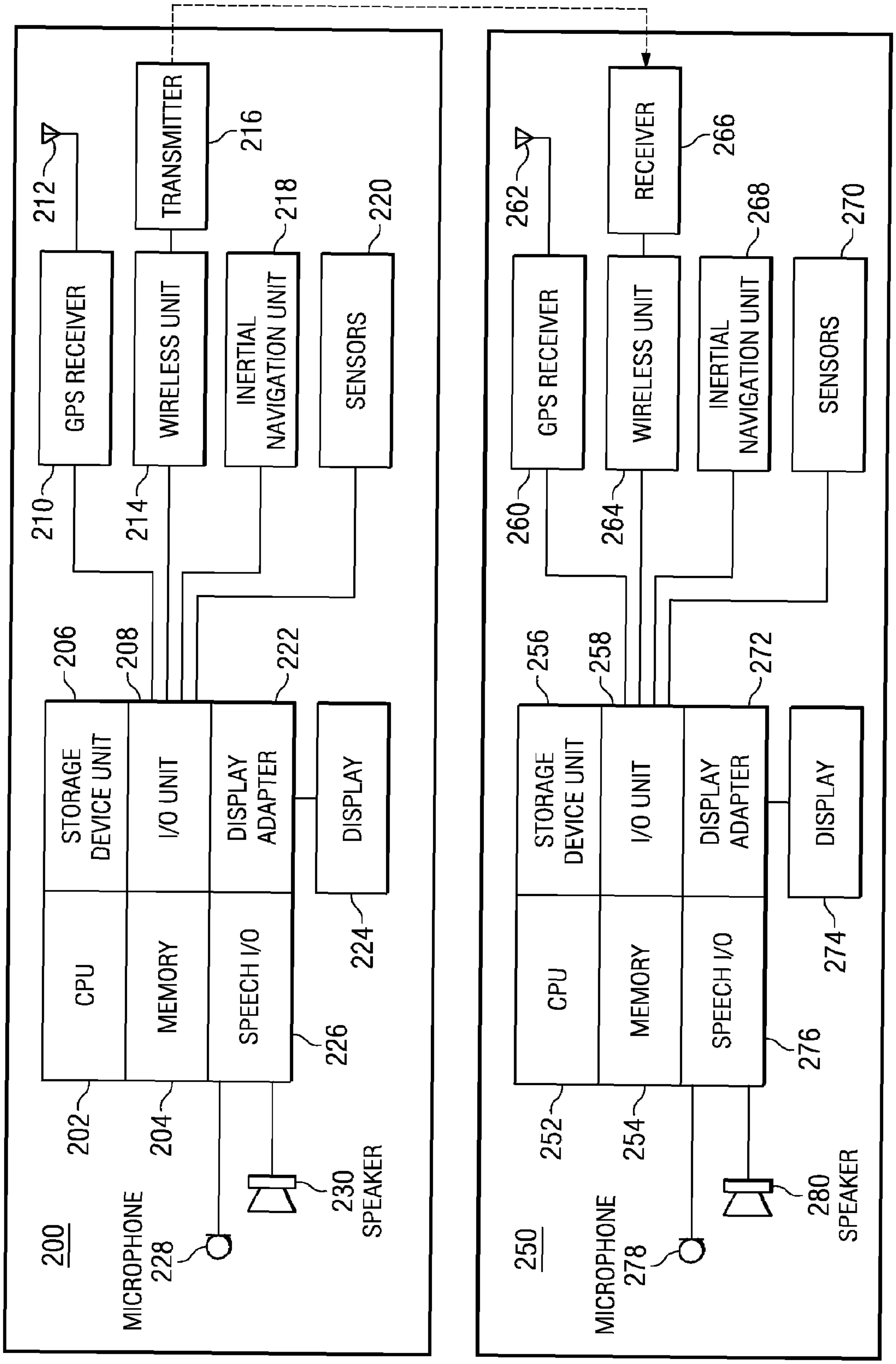
FIG. 2 is a block diagram of two vehicle computing platforms in accordance with an illustrative embodiment.

FIG. 2 is a block diagram of two vehicle computing platforms in accordance with an illustrative embodiment. FIG. 2 includes computing platforms 200 and 250. Computing platforms 200 and 250 each reside in a separate vehicle. In the illustrative embodiment, computing platforms 200 and 250 are residing in vehicles that are traveling directly behind each other, such as the configuration of vehicles 100 and 110 of FIG. 1.

Computing platform 200 is located within a first vehicle, such as vehicle 100 of FIG. 1. Computing platform 200 includes a CPU 202, which may be an embedded processor or processor such as a Pentium® processor from Intel Corporation (Pentium® is a trademark of Intel Corporation). Computing platform 200 also includes memory 204, which may take the form of random access memory (RAM) and/or read only memory (ROM).

Computing platform 200 contains storage device unit 206. Storage device unit 206 may contain one or more storage devices, such as, for example, a hard disk drive, a flash memory, a DVD drive, or a floppy disk. Vehicle computing platform 200 also includes input/output (I/O) unit 208, which provides connections to various I/O devices. In this embodiment, a GPS receiver 210 is included within vehicle computing system 200 and receives signals through antenna 212. Wireless unit 214 provides for two-way communications between computing platform 200 and computing platform 250. Communications are provided through transmitter 216. In addition, inertial navigation unit 218 is connected to I/O unit 208. Inertial navigation unit 218 is employed for navigation when GPS receiver 210 is unable to receive a usable signal or is inoperable.

A multitude of different sensors 220 also are connected to I/O unit 208. These sensors may include, sensors that detect speed, unusually high acceleration forces, airbag deployment, extensive speed up and slow down cycles, dropping out of cruise control, brake use, anti-lock brake occurrences, traction control use, windshield wiper use, turning on or off of lights for the vehicle, and outside light levels. In addition, sensors 220 may include sensors for detecting steering wheel movement, temperature, the state of door locks, and the state of windows. In other words, almost any condition or parameter about or around a vehicle may be detected through the use of sensors 220.

Computing platform 200 also includes display adapter 222, which is connected to display 224. In the depicted example, this display is a touch screen display. Alternatively or in addition to a touch screen display, display 224 also may employ a heads-up display on the dashboard, a heads-up display projected onto the windshield of the vehicle, or a separate unit within the vehicle. Computing platform 200 also includes a microphone 228 and a speaker 230 to provide a user with an ability to enter commands and receive responses through speech I/O 226 without having to divert the user's attention away from the road, or without the user having to remove the user's hands from the steering wheel.

Computing platform 250 is similar to computing platform 200. Computing platform 250 is located within a second vehicle, such as vehicle 110 of FIG. 1. Computing platform 250 includes a CPU 252, memory 254, storage device unit 256, and input/output (I/O) unit 258. In this embodiment, GPS receiver 260 is included within vehicle computing system 250 and receives signals through antenna 262. Wireless unit 264 provides for two-way communications between computing platform 250 and computing platform 200. Communications are provided through receiver 266. In addition, inertial navigation unit 268 is connected to I/O unit 258. Inertial navigation unit 268 is employed for navigation when GPS receiver 260 is unable to receive a usable signal or is otherwise inoperable. A multitude of different sensors 270 also are connected to I/O unit 258. Computing platform 250 also includes a display adapter 272, which is connected to display 274. Computing platform 250 also includes a microphone 278 and a speaker 280 to provide a user with an ability to enter commands and receive responses through speech I/O 276 without having to divert the user's attention away from the road, or without the user having to remove the user's hands from the steering wheel.

In use, sensors 220 detect an event within the first vehicle. Sensors 220 then send the event to CPU 202. An algorithm used to process the event is located in memory 204. CPU 202 uses the algorithm to determine whether a second vehicle should know of the event. To make the determination, CPU 202 compares the event against a predetermined list of events that indicates whether a second vehicle should know of the event. The predetermined list is determined by the user of the first vehicle, the manufacturer of the vehicle, a standards body, or the manufacturer of computer platforms 200 and 250. Events that may be included on the predetermined list include the application of the brake, the turning of the steering wheel, or the detection of a turn signal.

If CPU 202 finds that the event exists on the predetermined list, CPU 202 sends the event to wireless unit 214. Wireless unit 214 translates the event into a message and sends the message via transmitter 216 to receiver 266 of computing platform 250. Receiver 266 then transmits the message to wireless unit 264. Wireless unit 264 translates the message into an event and sends the event to CPU 252. CPU 252 then executes an algorithm to convert the event into an alarm signal. CPU 252 then transmits the alarm signal to display 274. Display 274 then indicates to the user of the second vehicle of a change of movement of the first vehicle.

Figure 3:
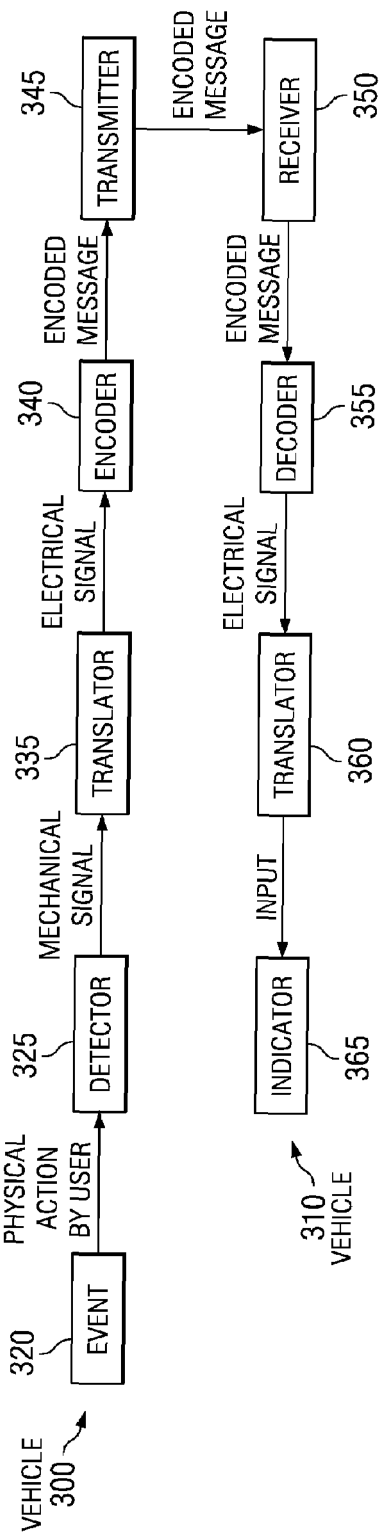
FIG. 3 shows a data flow for a first vehicle sending an event to a second vehicle in accordance with an illustrative embodiment.

FIG. 3 shows a data flow for a first vehicle sending an event to a second vehicle in accordance with an illustrative embodiment. In the illustrative embodiment, vehicle 300 transmits a message to vehicle 310. Vehicle 300 is a first vehicle and is similar to vehicle 100 of FIG. 1, and the system illustrated for vehicle 300 is implemented in a data processing system similar to computer platform 200 of FIG. 2. Vehicle 310 is a second vehicle and is similar to vehicle 110 of FIG. 1, and the system illustrated for vehicle 310 is implemented in a data processing system similar to computer platform 250 of FIG. 2.

Vehicle 300 includes event 320, detector 325, translator 335, encoder 340, and transmitter 345. In the illustrative embodiment, event 320 is any physical action applied by a user to vehicle 300, such as stepping on the brakes, turning the steering wheel, turning on a turn signal, or turning on the windshield wipers.

Detector 325 is a mechanical or optical device capable of recognizing event 320. For example, if event 320 is the act of stepping on a brake, detector 325 is the brake that the user depressed. After detector 325 recognizes event 320, detector 325 sends a mechanical signal to translator 335. Translator 335 can be any electrical component, such as a photodiode, potentiometer, integrated circuit, a switch, or an inductive device. Translator 335 then converts the mechanical signal into an electrical signal. Thus, for example, translator 335 converts the mechanical signal of a depressed brake into a voltage signal, which is a type of electrical signal. In the illustrative embodiment, both detector 325 and translator 353 are implemented as sensors, such as sensors 220 of FIG. 2, connected to an input/output unit, such as I/O unit 208 of FIG. 2.

After translator 335 converts event 320 into an electrical signal, translator 335 sends the electrical signal to encoder 340. Encoder 340 is an electrical component, such as an integrated circuit or a central processing unit (CPU). Encoder 340 may be implemented in a manner similar to CPU 202 of FIG. 2. Encoder 340 executes an algorithm to determine whether event 320 is an event that should be sent to vehicle 310. The list of events that should be sent to vehicle 310 may be pre-determined by the user of vehicle 300, the manufacturer of vehicle 300, a standards body, or the vendor supplying the system implemented in vehicle 300. If a determination is made that event 320 should be sent to vehicle 310, then encoder 340 converts the electrical signal sent from translator 335 into an encoded message. If encoder 340 is a digital device, then encoder 340 converts the electrical signal into a data packet to form the encoded message. If encoder 340 is an analog device, then encoder 340 modulates the electrical signal to form an encoded message.

Encoder 340 then sends the encoded message to transmitter 345. Transmitter 345 is similar to transmitter 105 of FIG. 1. Transmitter 345 may also be implemented as input/output (I/O) unit 208, wireless unit 214, and transmitter 216 of FIG. 2. Transmitter 345 sends the encoded message to receiver 350 on vehicle 310.

Vehicle 310 has similar to components to vehicle 300. Vehicle 310 includes receiver 350, decoder 355, translator 360, and indicator 365. Receiver 350 is similar to receiver 115 of FIG. 1. Receiver 350 may also be implemented as input/output (I/O) unit 258, wireless unit 264, and receiver 266 of FIG. 2. Receiver 350 receives the encoded message from vehicle 300 and either converts or demodulates the encoded message. Receiver 350 then sends the encoded message to decoder 355.

Decoder 355 functions similarly to encoder 340, except that decoder 355 converts an encoded message into an electrical signal. Decoder 355 is an electrical component, such as an integrated circuit or a central processing unit (CPU). Decoder 355 may be implemented in a manner similar to CPU 252 of FIG. 2. Decoder 355 determines whether an event from vehicle 300 should be communicated to the user of vehicle 310. The list of events that should be communicated to the user of vehicle 310 may be pre-determined by the user of vehicle 310, the manufacturer of vehicle 310, a standards body, or the vendor supplying the system implemented in vehicle 310.

After decoder 355 determines that the event from vehicle 300 should be communicated, decoder 355 sends the electrical signal to translator 360. Translator 360 is similar to translator 335, except that translator 360 converts the electrical signal to an appropriate input for indicator 365. Indicator 365 may be a visual, audio, or tactile indicator. Therefore, depending on the type of indicator, translator 360 converts electrical signal to an optical, audio, or mechanical input.

Indicator 365 informs the user of vehicle 310 of an event in vehicle 300. In other words, indicator 365 communicates event 320 which indicates that the user of vehicle 300 intends on changing the movement of vehicle 300. Indicator 365 may be a visual, audio, or tactile alarm. For example, a visual indicator may be a flashing light on the dashboard of vehicle 310 or a textual message on an on-board computer system within vehicle 310. An audio indicator may be the sounding of the horn or other audio signal, such as an audio recording or speech, within vehicle 310. A tactile indicator may be the steering wheel vibrating.

The illustrative embodiment provides that multiple indicators may be used simultaneously or to indicate different events. The illustrative embodiment also allows for a user to configure the type of indicator to be used for a particular event. For example, a user may designate a flashing light on the dashboard of vehicle 310 to indicate that the user has stepped on the brakes in vehicle 300. The user of vehicle 310 may then designate the vibration of steering wheel to indicate a sudden left or right turn by vehicle 300. An algorithm located within the memory of the data processing system within vehicle 310 enables the user to configure the indicators. An algorithm within decoder 355 determines which indicator matches which event.

The illustrative embodiments are not limited to the depicted examples. Other devices with similar functions may be used to implement the invention. A person of ordinary skill in the art will identify other mechanisms to implement the depicted embodiment.

Figure 4:
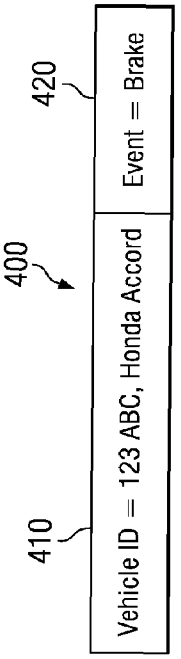
FIG. 4 illustrates an encoded message in accordance with an illustrative embodiment.

FIG. 4 illustrates an encoded message in accordance with an illustrative embodiment. Encoded message 400 is created in an encoder, such as encoder 340 of FIG. 3, and decoded by a decoder, such as decoder 355 of FIG. 3.

Encoded message 400 is a data packet generated by a digital encoder. Encoded message 400 may be implemented as an extensible markup language (XML) file or a software protocol. In an alternative embodiment, encoded message 400 may be implemented as a modulated signal from an analog encoder.

In the illustrative embodiment, encoded message 400 includes vehicle ID 410 and event 420. Vehicle ID 410 is a description identifying a first vehicle. In application, a first vehicle travels directly ahead of a second vehicle. Thus, a first vehicle is similar to vehicle 100 of FIG. 1, and a second vehicle is similar to vehicle 110 of FIG. 1. Vehicle ID 410 may be any identifying information, such as the license plate number, the make and model of the vehicle, or a vehicle identification number. In the illustrative embodiment, vehicle ID 410 includes a license plate number and the make and model of the first vehicle. Thus, the license plate number is "123 ABC," and the first vehicle is a "Honda Accord."

Event 420 identifies an event within the first vehicle. Thus, event 420 identifies the intent of a user to change the movement of the first vehicle. Event 420 identifies a mechanical action, such as the depression of a brake or the movement of a steering wheel to the right or left. Event 420 may be identified as a number or actual text. If identified as a number, an individual event would be tied to a single number. For example, the number "1" may identify the depression of a brake, the number "2" may identify the turning of a steering wheel to the left, and the number "3" may identify the turning of a steering wheel to the right. If identified as actual text, a single phrase may be used to identify a particular event. For example, the depression of a brake may be indicated as "brake," or the turning of a steering wheel to the left may be indicated as "left turn." In the illustrative embodiment, event 420 is in a text format and identifies the depression of the brake.

The illustrative embodiment provides that event 420 will only include the events which are previously identified as events to be sent to the user of a second vehicle. Thus, events that may not concern or is not pertinent a user in a second vehicle will not be part of encoded message 400.

Encoded message 400 is shown for illustrative purposes only. The illustrative embodiments are not limited to the depicted example. For example, additional or less information may be included in encoded message 400.

Figure 5:
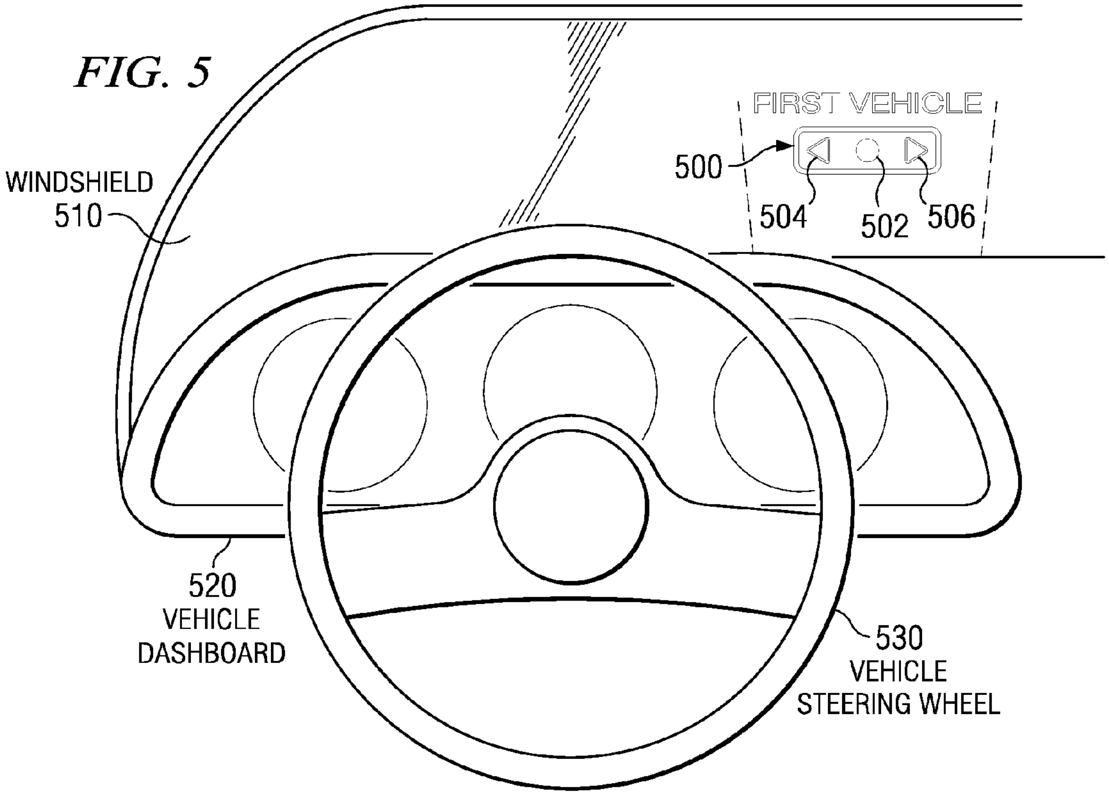
FIG. 5 illustrates an example heads-up display in accordance with an illustrative embodiment.

FIG. 5 illustrates an example heads-up display in accordance with an illustrative embodiment. Heads-up display 500 is in a second vehicle and is located on windshield 510 above dashboard 520 and vehicle steering wheel 530. Heads-up display 500 may be implemented as display 274 of FIG. 2 or indicator 365 of FIG. 3. Heads-up display 500 notifies the user of a second vehicle of an event by a user in the first vehicle.

Heads up display 500 is a lighted display indicator. Heads up display 500 includes brake indicator 502, left turn indicator 504, and right turn indicator 506. Brake indicator 502 indicates that the first vehicle is stopping. In other words, the user in the first vehicle has depressed the brake pedal. In the illustrative embodiment, brake indicator 502 is a red light. If the red light is on, then the user has stepped on the brakes in the first vehicle. If the red light is not on, then the user has not stepped on the brakes.

Left turn indicator 504 indicates that the first vehicle is making a left turn. In other words, the user in the first vehicle has either turned on the left signal light or moved the steering wheel such that the first vehicle is turning left. Likewise, right turn indicator 506 indicates that the first vehicle is making a right turn or moved the steering wheel such that the first vehicle is turning right. In the illustrative embodiment, both left turn indicator 504 and right turn indicator 506 are lights.

The illustrative embodiments are not limited to the depicted example. For example, heads-up display 500 may be projected in another form other than a lighted display. Additionally, heads-up display 500 may be implemented as part of vehicle dashboard 520. Additionally, more or less indicators may be included on heads-up display 500. The indicators may also be implemented in a form other than a light. Also, additional dashboard features, such as a speedometer, odometer, gas tank gauge, or check engine light, may also be included in vehicle dashboard 520.

Figure 6:
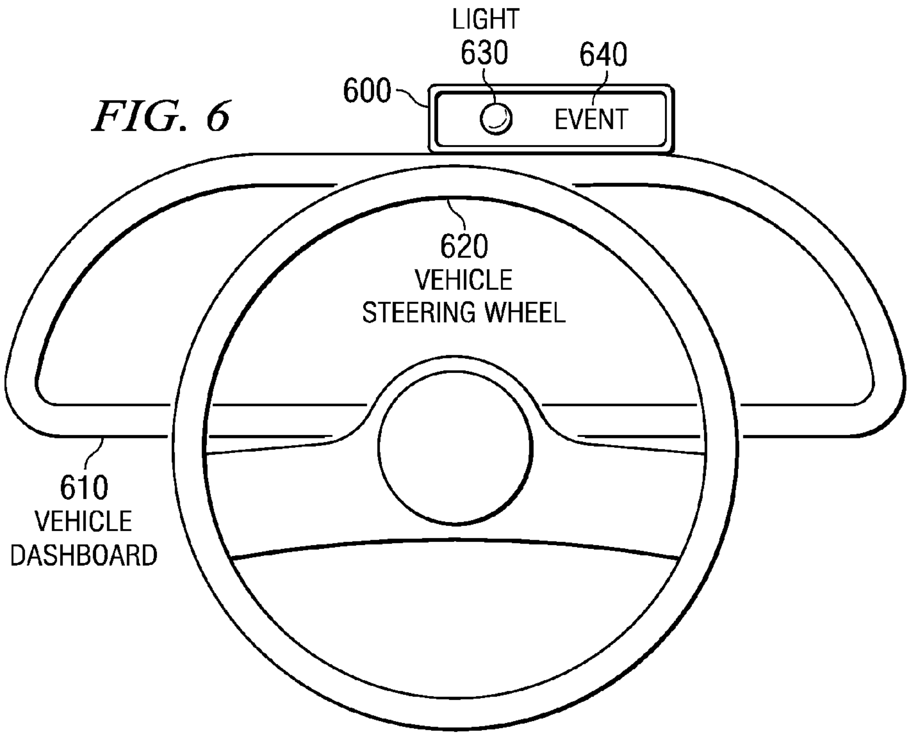
FIG. 6 illustrates an example display which would be molded into a vehicle dashboard in accordance with an illustrative embodiment.

FIG. 6 illustrates an example display that is molded into a vehicle dashboard in accordance with an illustrative embodiment. Display 600 is an indicator which notifies the user of a second vehicle of an event from a first vehicle. Display 600 may be implemented as display 224 of FIG. 2 or indicator 365 of FIG. 3.

In the illustrative embodiment, display 600 is molded into the vehicle dashboard 610 of the second vehicle and is located above vehicle steering wheel 620. Display 600 includes light 630 and event 640. In the illustrative embodiment, light 630 indicates that an event is occurring in the first vehicle. Event 640 is a text display that identifies the kind of event occurring in the first vehicle. For example, if the user in the first vehicle depresses the brakes, light 630 will turn on and event 640 will display the word “stop.” In another example, if the user in the first vehicle turns on the left signal light, then light 630 will turn on and event 640 will display the words “left turn.”

The illustrative embodiments are not limited to the depicted example. For example, additional or less indicators may be included on display 600. The indicators may also be implemented in a form other than a light.

Figure 7:
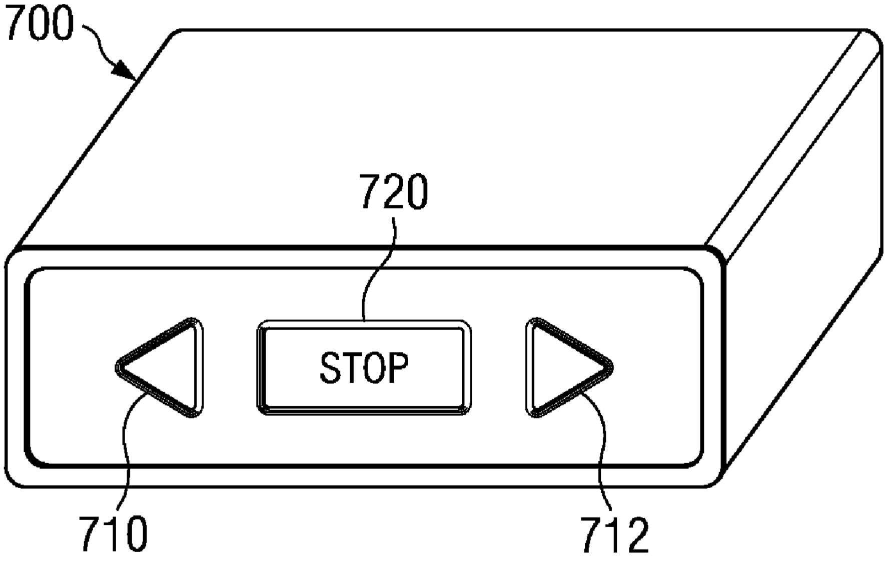
FIG. 7 illustrates an example stand-alone device in accordance with an illustrative embodiment.

FIG. 7 illustrates an example stand-alone device in accordance with an illustrative embodiment. Stand-alone device 700 is device which notifies the user of a second vehicle of an event from a first vehicle. Stand-alone device 700 may be implemented as indicator 365 of FIG. 3.

Stand-alone device 700 may be attached anywhere in the second vehicle. In practice, stand-alone device 700 will probably be attached to the front windshield or dashboard of the second vehicle. Stand-alone device 700 includes left turn indicator 710, stop indicator 720, and right turn indicator 712. In the illustrative embodiment, left turn indicator 710, stop indicator 720, and right turn indicator 712 are all lights. If the first vehicle is stopping, then stop indicator 720 will light. If the user turns the left signal light on, then left turn indicator 710 will light. If the user turns the right signal light on, then right turn indicator 712 will light.

Although three indicators are shown in this example, other numbers of indicators may be used on stand-alone device 700. Further, these indicators may also be implemented in a form other than a light.

Figure 8:
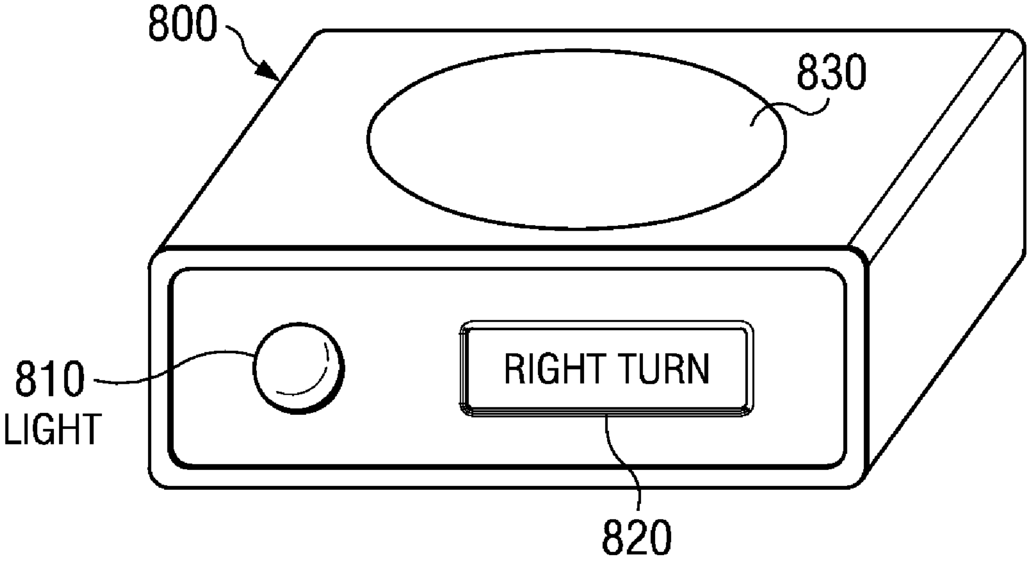
FIG. 8 illustrates an example stand-alone device with an audio speaker in accordance with an illustrative embodiment.

FIG. 8 illustrates an example stand-alone device with an audio speaker in accordance with an illustrative embodiment. Stand-alone device 800 is a device which notifies the user of a second vehicle of an event from a first vehicle. Stand-alone device 800 may be implemented as indicator 365 of FIG. 3.

Stand-alone device 800 may be attached anywhere in the second vehicle. In practice, stand-alone device 800 will probably be attached to the front windshield or dashboard of the second vehicle. Stand-alone device 800 includes light 810, event indicator 820, and audio speaker 830. In the illustrative embodiment, light 810 indicates that an event is occurring in the first vehicle. Event indicator 820 is a text display that identifies the kind of event occurring in the first vehicle. In the illustrative embodiment, event indicator 820 shows that the first vehicle is making a right turn. In use, when an event is displayed in event indicator 820, then light 810 will also be lit. Thus, in the illustrative embodiment, light 810 is lit because a “right turn” event is displayed in event indicator 820.

Audio speaker 830 is an example of an audio indicator. Audio speaker 830 may emit a variety of sounds to indicate a particular event. Example sounds include music, tones, or actual spoken words. In the illustrative embodiment, audio speaker 830 speaks the event displayed in event indicator 820. Thus, in the illustrative embodiment, the user of the second vehicle will hear the words “right turn” as the “right turn” event is displayed in event indicator 820. However, in an alternative embodiment, audio speaker 830 may be used independently of event 820. Thus, a user may configure audio speaker 830 to emit a sound for some events, while event 820 displays other events.

Figure 9:
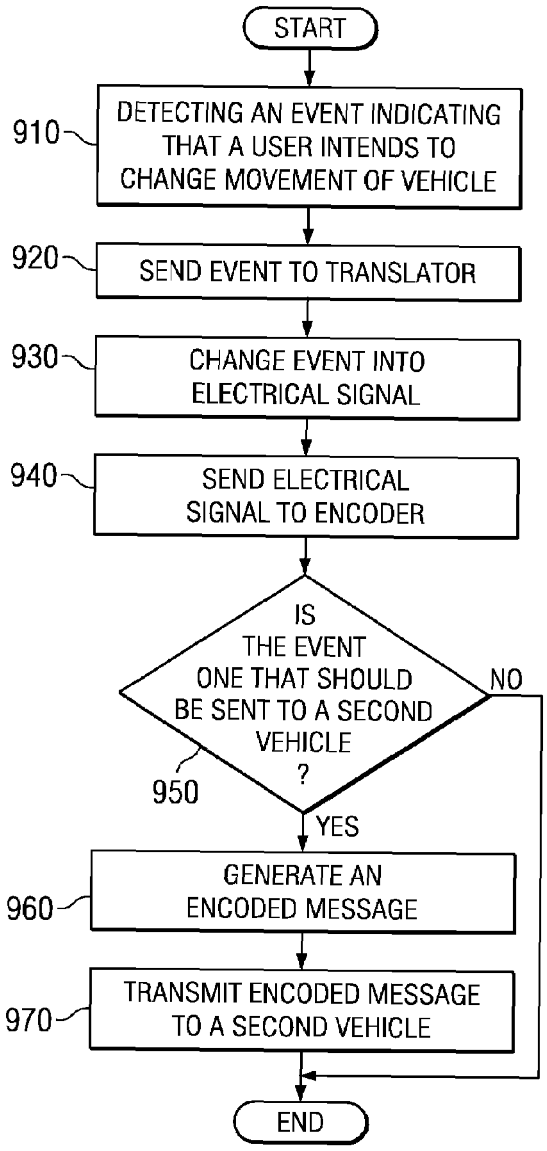
FIG. 9 is a flowchart of an encoded message being sent by a vehicle in accordance with an illustrative embodiment.

FIG. 9 is a flowchart of an encoded message being sent by a vehicle in accordance with an illustrative embodiment. FIG. 9 is executed in a first vehicle, such as vehicle 100 of FIG. 1.

The process begins with a detector in the first vehicle detecting an event that indicates that a user intends to change movement of the first vehicle (step 910). The detector then sends the event to a translator (step 920). The translator converts the event into an electrical signal (step 930). The electrical signal is then sent to an encoder (step 940). The encoder then determines whether the event is one that should be sent to a second vehicle (step 950). To make the determination, the encoder compares the event against a predetermined list of events. The predetermined list indicates whether the event should be sent to the second vehicle. If the event is not included on the predetermined list (“no” output to step 950), the process terminates thereafter. However, if the event is included on the predetermined list (“yes” output to step 950), then the encoder generates an encoded message (step 960) and transmits the encoded message to a second vehicle (step 970), with the process terminating thereafter.

Figure 10:
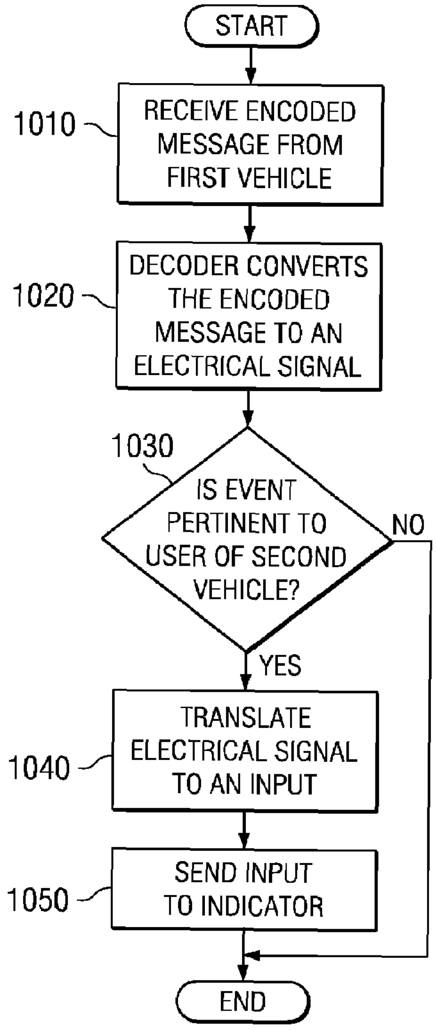
FIG. 10 is a flowchart of an encoded message being received by a vehicle in accordance with an illustrative embodiment.

FIG. 10 is a flowchart of an encoded message being received by a vehicle in accordance with an illustrative embodiment. FIG. 10 is executed in a vehicle, such as vehicle 110 of FIG. 1. The process begins with the vehicle receiving an encoded message from a first vehicle (step 1010). The vehicle then decodes or converts the encoded message to an electrical signal (step 1020). A determination is then made as to whether the event encoded into the message is pertinent to the user of the second vehicle (step 1030). To determine whether the event is pertinent, the decoder compares the event with a predetermined list of events. The predetermined list of events indicates whether an event is pertinent or not pertinent. If the event is not included on the predetermined list ("no" output step 1030), the process terminates thereafter. However, if the event is included on the predetermined list ("yes" output to step 1030), then the electrical signal is translated to an input (step 1040), and the input is sent to an indicator (step 1050), with the process terminating thereafter.

Thus, the illustrative embodiments provide a method system, computer program product, and computer implemented method for sending an event between vehicles. The method includes detecting an event of a vehicle. The event is for a user action that indicates an intent to change movement of the vehicle. The vehicle determines whether the event should be sent to a second vehicle. If the event should be sent to a second vehicle, the vehicle sends the event to the second vehicle. The event is transmitted in the form of an encoded message. The second vehicle receives the encoded message and processes the encoded message. An input is then sent and is communicated as an indicator to the user of the second vehicle. The indicator may be a visual indicator, an audio indicator, a tactile indicator, or any combination thereof.

The ability to communicate an event of a first vehicle to another vehicle allows the user of the other vehicle to appropriately respond to an event. Current vehicle signals may not provide enough information for the user of the vehicle to make a proper response. Additionally, current vehicle signals may not alert the user of the vehicle in a timely manner. Therefore, users are not provided with the opportunity to appropriately respond. The illustrative embodiments provide the user of the other vehicle with a mechanism to avoid or at least reduce the impact of an accident with a first vehicle.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for sending events between vehicles, the method comprising:

detecting an event within a vehicle, wherein the event is for a user action that indicates an intent to change movement of the vehicle;

determining whether the event should be sent to another vehicle by configuring the vehicle to decode encoded messages to form a list of identified messages, wherein the list of identified messages are preprogrammed by a user of the another vehicle; and responsive to determining whether the event should be sent to another vehicle, sending the event to the another vehicle.

2. The method of claim 1, wherein the step of sending the event to another vehicle comprises:

generating an encoded message, wherein the encoded message includes the event; and transmitting the encoded message to the another vehicle.

3. The method of claim 2, wherein the transmission of the encoded message is any of an infrared, a laser, a sonic, or wireless transmission.

4. The method of claim 2, further comprising:

receiving the encoded message from the vehicle by the another vehicle;

responsive to receiving the encoded message from the vehicle, alerting the user of the another vehicle of the event.

5. The method of claim 4, wherein the step of alerting the user of the event comprises:

decoding the encoded message;

translating the encoded message to an indicator; and sending the indicator to the user of the another vehicle.

6. The method of claim 5, wherein the indicator is any of a visual, an audio, and a tactile indicator.

7. A computer implemented method for sending signals between vehicles, the computer implemented method comprising:

detecting an event within a vehicle, wherein the event is for a user action that indicates an intent to change movement of the vehicle;

determining whether the event should be sent to another vehicle by configuring the vehicle to decode encoded messages to form a list of identified messages, wherein the list of identified messages are preprogrammed by the user of the another vehicle;

responsive to determining that the event should be sent to another vehicle, sending the event to the another vehicle;

receiving the event from the vehicle by another vehicle; and responsive to receiving the event from the vehicle, alerting the user of the another vehicle of the event.

* * * * *